(12) United States Patent
Varma et al.

(10) Patent No.: US 12,270,563 B2
(45) Date of Patent: Apr. 8, 2025

(54) AIR-CONDITIONER FAN, AND METHOD AND DEVICE FOR CONTROLLING SAME

(71) Applicant: JMATEK (ZHONGSHAN) LTD., Guangdong (CN)

(72) Inventors: Sanjay Varma, Zhongshan (CN); Anand Vyas, Zhongshan (CN); Yi Pu, Zhongshan (CN); Heping Peng, Zhongshan (CN)

(73) Assignee: Airtek International Corporation Limited, Hong Kong (CN)

( * ) Notice: Subject to any disclaimer, the term of this patent is extended or adjusted under 35 U.S.C. 154(b) by 179 days.

(21) Appl. No.: 17/756,686

(22) PCT Filed: Jun. 28, 2020

(86) PCT No.: PCT/CN2020/098575
§ 371 (c)(1),
(2) Date: May 31, 2022

(87) PCT Pub. No.: WO2021/159654
PCT Pub. Date: Aug. 19, 2021

(65) Prior Publication Data
US 2024/0200817 A1   Jun. 20, 2024

(30) Foreign Application Priority Data

Feb. 13, 2020   (CN) .......................... 202010091556.1

(51) Int. Cl.
*F24F 11/65*   (2018.01)
*F24F 110/12*   (2018.01)
*F24F 110/22*   (2018.01)

(52) U.S. Cl.
CPC ........... *F24F 11/65* (2018.01); *F24F 2110/12* (2018.01); *F24F 2110/22* (2018.01)

(58) Field of Classification Search
CPC ............... F24F 2110/22; F24F 2110/12; F24F 2110/10; F24F 11/30; F24F 11/77; F24F 11/65
See application file for complete search history.

(56) References Cited

U.S. PATENT DOCUMENTS 9,857,810 B2 *   1/2018   Smith, Jr. ............... F24D 5/005
10,712,036 B2 *   7/2020   Mowris .................... F24F 11/76
(Continued)

FOREIGN PATENT DOCUMENTS

| CN | 102444949 A | 5/2012 |
|----|-------------|--------|
| CN | 202532630 U | 11/2012 |

(Continued)

OTHER PUBLICATIONS

International Search Report of PCT/CN2020/098575.

*Primary Examiner* — Nelson J Nieves
*Assistant Examiner* — Meraj A Shaikh
(74) *Attorney, Agent, or Firm* — Wang Law Firm, Inc.

(57) ABSTRACT

The disclosure provides a method for controlling an air-conditioner fan. The method comprises the following steps: collecting the current environment temperature; collecting the current environment humidity; and determining the working states of a water pump and a draught fan based on the current environment temperature and the current environment humidity, wherein the working states comprise an operating state and a standby state. The method has the advantages that working states of the water pump and the draught fan in the air-conditioner fan are automatically adjusted according to the temperature and the humidity of the current environment, so that the degree of automation is improved, the energy is saved, and meanwhile, the user experience is improved.

12 Claims, 2 Drawing Sheets

(56) References Cited

U.S. PATENT DOCUMENTS

| | | | | |
|---|---|---|---|---|
| 11,175,056 B1* | 11/2021 | Stevenson | ............... | F24F 11/74 |
| 11,255,558 B1* | 2/2022 | Kraft | ................ | F24F 11/64 |
| 2002/0124992 A1* | 9/2002 | Rainer | ................ | F24F 11/62 |
| | | | | 165/57 |
| 2017/0115025 A1* | 4/2017 | Mowris | ............... | F24D 19/1087 |
| 2019/0195523 A1* | 6/2019 | Mowris | ................ | F24F 11/61 |

FOREIGN PATENT DOCUMENTS

| | | |
|---|---|---|
| CN | 104807137 A | 7/2015 |
| CN | 209459141 U | 10/2019 |
| CN | 202464189 U | 10/2021 |
| KR | 101347077 B1 | 1/2014 |

\* cited by examiner

AIR-CONDITIONER FAN, AND METHOD AND DEVICE FOR CONTROLLING SAME

TECHNICAL FIELD

The disclosure belongs to the technical field of air-conditioner fans, in particular to an air-conditioner fan, and a method and a device for controlling the same.

BACKGROUND

In the prior art, due to the fact that an air-conditioner fan cannot automatically set the temperature and the humidity, when a user turns on the air-conditioner fan, the temperature and the humidity need to be set, and the temperature and the humidity in the air can be changed along with time changes, and if the air-conditioner fan still works according to the temperature and the humidity set by the user, the environment temperature or humidity exceeds the range of a comfort degree of the user, therefore, on one hand, the user experience is reduced, and on the other hand, energy is wasted.

Therefore, in order to solve the technical problem, it is necessary to provide an air-conditioner fan, and the air-conditioner fan can collect the temperature and humidity of the air in real time and automatically adjust the working state according to the parameters of the temperature and humidity of the air.

SUMMARY

The disclosure aims at providing an air-conditioner fan, and a method and a device for controlling the same so as to solve the problem that an air-conditioner fan cannot adjust the working state according to real-time temperature and humidity in the prior art.

In order to achieve the purpose, the technical scheme provided by one embodiment of the disclosure is as follows:

in one embodiment, the disclosure provides a method for controlling the air-conditioner fan, and the method comprises the following steps:

collecting the current environment temperature and humidity; and determining the working states of a water pump and a draught fan based on the current environment temperature and the current environment humidity, wherein the working states comprise an operating state and a standby state.

Optionally, the step of determining the working states of the water pump and the draught fan based on the current environment temperature and the current environment humidity specifically comprises the following substeps:

controlling the draught fan to be standby and the water pump to be standby when the environment temperature is less than a first preset temperature; and/or controlling the draught fan to operate and the water pump to operate when the environment temperature is greater than or equal to a second preset temperature.

Optionally, the step of determining the working states of the draught fan and the water pump based on the current environment temperature and the current environment humidity also specifically comprises the following substeps:

determining a temperature reference value according to a first preset weight and the current environment temperature;

determining a humidity reference value according to a second preset weight and the current environment humidity; and determining the working states of the draught fan and the water pump according to the temperature reference value, the humidity reference value and a preset standard value.

Optionally, the step of determining the working states of the draught fan and the water pump according to the temperature reference value, the humidity reference value and the preset standard value specifically comprises the following substeps:

controlling the draught fan to operate and the water pump to operate if the sum of the temperature reference value and the humidity reference value is greater than the preset standard value; and/or controlling the draught fan to be standby and the water pump to be standby if the sum of the temperature reference value and the humidity reference value is less than or equal to the preset standard value.

Optionally, the method also comprises the following steps:

controlling the water pump to be standby if the current environment humidity is greater than or equal to a first preset humidity value; and/or controlling the water pump to operate and the draught fan to operate if the current environment temperature is less than a second preset humidity value.

One embodiment of the disclosure also provides a device for controlling an air-conditioner fan, comprising a temperature and humidity detection module, used for collecting the current environment temperature and the current environment humidity; and a control module, used for determining the working states of a water pump and a draught fan in the air-conditioner fan based on the current environment temperature and the current environment humidity, wherein the working states comprise an operating state and a standby state.

Optionally, the control module is specifically used for controlling the draught fan to be standby and the water pump to be standby when the environment temperature is less than a first preset temperature; and/or controlling the draught fan to operate and the water pump to operate when the environment temperature is greater than or equal to a second preset temperature.

Optionally, the control module is also specifically used for determining a temperature reference value according to a first preset weight and the current environment temperature;

determining a humidity reference value according to a second preset weight and the current environment humidity; and determining the working states of the draught fan and the water pump according to the temperature reference value, the humidity reference value and a preset standard value.

Optionally, the control module determines the working states of the draught fan and the water pump according to the temperature reference value, the humidity reference value and the preset standard value, specifically executing the following steps:

controlling the draught fan to operate and the water pump to operate if the sum of the temperature reference value and the humidity reference value is greater than the preset standard value; and/or controlling the draught fan to be standby and the water pump to be standby if the sum of the temperature reference value and the humidity reference value is less than or equal to the preset standard value.

Optionally, the control module controls the water pump to be standby or operate, specifically executing the following steps:

controlling the water pump to be standby if the current environment humidity is greater than or equal to the first preset humidity value; and/or controlling the water pump to operate and the draught fan to operate if the current environment temperature is less than the second preset humidity value.

Optionally, the temperature and humidity detection module comprises a temperature and humidity sensor; and/or the temperature and humidity sensor is arranged at an air inlet of the air-conditioner fan.

Optionally, one embodiment of the disclosure also provides an air-conditioner fan, comprising a control device according to any one of claims, and a draught fan and a water pump; and/or the water pump and the draught fan are controlled to operate or be standby by using the control method according to any one of above claims.

Compared with the prior art, according to the scheme of the disclosure, the current environment temperature and the current environment humidity are collected, the working states of the water pump and the draught fan in the air-conditioner fan are automatically adjusted according to the temperature and the humidity of the current environment, the degree of automation is improved, the energy is saved, and meanwhile, the user experience is improved.

BRIEF DESCRIPTION OF THE DRAWINGS

In order to illustrate the technical scheme in the embodiment of the disclosure or in the prior art more clearly, the accompanying diagrams needing to be used in the embodiment or in the description in the prior art are simply described. Apparently, the embodiments recorded in the following description are merely a part rather than all of the embodiments of the disclosure. For those of ordinary skill in the art, under the premise of without contributing creative labor, other accompanying diagrams further can be obtained according to these accompanying diagrams.

DESCRIPTION OF THE EMBODIMENTS

The disclosure is described in detail in conjunction with the following embodiments as shown in the accompanying diagrams. However, the disclosure is not restricted by the embodiment, and the conversion of structures, methods or functions made by those skilled in the art according to the embodiment contains in the scope of protection of the disclosure.

Figure 1:
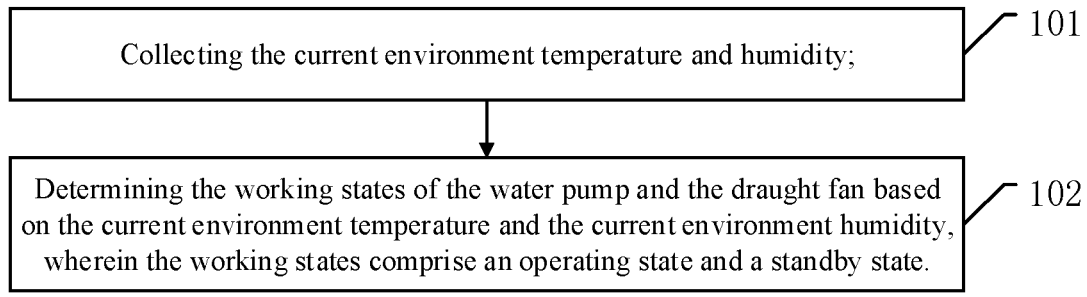
FIG. 1 is a schematic diagram of steps of a method for controlling an air-conditioner fan provided in one embodiment of the disclosure.

Referring to FIG. 1 which is a schematic diagram of steps of a method for controlling an air-conditioner fan provided in the embodiment of the disclosure, the method for controlling the air-conditioner fan may comprise the following steps:

S101, collecting the current environment temperature and humidity;

From S101, the current environment temperature is collected by the air-conditioner fan, and the current environment temperature can be acquired by temperature collection devices, such as a temperature or other collection devices, specifically according to actual requirements, which is unlimited herein. Collected temperature data are sent to a control module of the air-conditioner fan by the temperature collection device. The collection frequency can be set to be relatively long time under an environment with smaller temperature variation, for example, the data are collected once every half hour. Correspondingly, the collection frequency can be set to be relatively short time under an environment with larger temperature variation, for example, the data are collected once every five minutes. The specific collection frequency can be set according to the actual service environment, which is unlimited herein.

Correspondingly, the current environment humidity is collected by the air-conditioner fan, the current environment humidity can be acquired by humidity collection devices, such as a humidity sensor or other collection devices, or the current environment humidity is collected in other forms according to actual requirements, which is unlimited herein. Collected humidity data are sent to the control module of the air-conditioner fan by the humidity collection device. Similarly, the collection frequency can be set to be relatively long time under the environment with smaller humidity variation, for example, the data are collected once every half hour. Correspondingly, the collection frequency can be set to be relatively short time under the environment with larger humidity variation, for example, the data are collected once every five minutes. The specific collection frequency can be set according to the actual service environment, which is unlimited herein.

In specific application, in order to avoid data errors caused by single-time collection, temperature or humidity data can be collected for multiple times according to certain frequency within specified time, multiple groups of temperature or humidity data are sent to the control module, the control module averages the data corresponding to the temperature and the humidity respectively, the average value is used as a final temperature and humidity value, and the working state of a draught fan or a water pump is determined according to the temperature and humidity value.

In specific application, due to the fact that data collected by a single collection device may be inaccurate, for example, the indoor air temperature and humidity are not uniform, or the single collection device breaks down, in order to avoid the problems, a plurality of temperature and humidity collection devices can be arranged at different positions of the air-conditioner fan, and data fed back by the temperature and humidity collection devices are analyzed, and finally, accurate temperature and humidity values are obtained.

S102, determining the working states of the water pump and the draught fan based on the current environment temperature and the current environment humidity, wherein the working states comprise an operating state and a standby state.

It should be understood that the control module of the air-conditioner fan receives the temperature and humidity data acquired by the collection device, judges the working states of the water pump and the draught fan under the current temperature and humidity according to preset rules, and controls the water pump or the draught fan to be standby or operate according to the judgment result. In the embodiment of the disclosure, the standby working state means that the water pump or the draught fan is in a power connection state but does not carry out substantial work. The working state refers to that the water pump or the draught fan is not only in a power connection state, but also can carry out substantial work, such as humidity increase or air blowing.

Furthermore, the step of determining the working states of the water pump and the draught fan based on the current environment temperature and the current environment humidity specifically comprises the following substeps:

controlling the draught fan to be standby and the water pump to be standby when the environment temperature is less than a first preset temperature; and/or controlling the draught fan to operate and the water pump to operate when the environment temperature is greater than or equal to a second preset temperature.

In an achievable scheme, the first temperature and the second temperature can be preset, and when the environment temperature is less than the first temperature, the draught fan and the water pump are controlled to be standby; and when the environment temperature is greater than or equal to the preset second temperature, the fan and the water pump are controlled to operate. Wherein the first temperature value is less than the second temperature value, generally, the first temperature can be 23 DEG C., the second temperature can be 27 DEG C., and adjustment can be performed according to actual conditions without limitation.

Furthermore, the step of determining the working states of the water pump and the draught fan based on the current environment temperature and the current environment humidity also specifically comprises the following substeps:

determining a temperature reference value according to a first preset weight and the current environment temperature;

determining a humidity reference value according to a second preset weight and the current environment humidity; and determining the working states of the draught fan and the water pump according to the temperature reference value, the humidity reference value and a preset standard value.

In another achievable scheme, the working states of the draught fan and the water pump can be determined through the preset weights of the current environment temperature and the current environment humidity and the preset standard value. Wherein the first preset weight is the weight corresponding to the current environment temperature, and the temperature reference value is the product of the first preset weight and the current environment temperature; the second preset weight is the weight corresponding to the current environment humidity, and the humidity reference value is the product of the second preset weight and the current environment humidity. In most cases, the influence of temperature on body feeling is large, so that in the scheme of the disclosure, the first preset weight can be 90%; and correspondingly, the influence of the environment humidity on body feeling is less than that of the environment temperature, and the second preset weight can be 10%.

However, in specific application, the weights corresponding to the environment temperature and humidity may be set according to different regions or seasons, which are unlimited herein.

Furthermore, the step of determining the working states of the draught fan and the water pump according to the temperature reference value, the humidity reference value and the preset standard value specifically comprises the following substeps:

controlling the draught fan to operate and the water pump to operate if the sum of the temperature reference value and the humidity reference value is greater than the preset standard value; and/or controlling the draught fan to be standby and the water pump to be standby if the sum of the temperature reference value and the humidity reference value is less than or equal to the preset standard value.

It should be understood that the preset standard value is the highest value making a human body feel comfortable, if the sum of the temperature reference value and the humidity reference value is greater than the preset standard value, the current environment temperature is too high, and therefore, the draught fan and the water pump need to be controlled to operate so that the environment temperature is reduced. Correspondingly, if the sum of the temperature reference value and the humidity reference value is less than or equal to the preset standard value, the current environment temperature is within a human comfort range, cooling is not needed, and therefore, the draught fan and the water pump can be controlled to be standby.

In one embodiment, the unit of the current environment temperature is DEG C. and the preset standard value is 28, for example, the current environment temperature is 24 DEG C., the current ambient humidity is 55, the first preset weight is 90%, the second preset weight is 10%, the calculated value (55*10%+24*90%)−28 is less than 0; and therefore, the draught fan does not operate and the water pump does not operate in the current temperature and humidity environment. For example, the air-conditioner fan is set to be of four gears of standby temperatures which are 23 DEG C., 24 DEG C., 25 DEG C. and 26 DEG C. Corresponding to the first preset weight being 90% and the second preset weight being 10%, if the current environment temperature is less than 23 DEG C., the draught fan and the water pump are controlled to be standby; if the current environment temperature is greater than or equal to 27 DEG C., the draught fan is controlled to operate, but the water pump does not necessarily operate; if the current environment temperature is 24 DEG C., the humidity is 64 or below, the water pump is standby and the draught fan is standby when the humidity is 40 or above; if the current environment temperature is 25 DEG C., the humidity is 55 or below, the water pump is standby and the draught fan is standby when the humidity is 40 or above; if the current environment temperature is 26 DEG C., the humidity is 46 or below, and the water pump is standby and the draught fan is standby when the humidity is 40 or below; if the current environment humidity is greater than 80, the water pump is controlled to be standby; and if the current environment humidity is less than 40, the water pump is controlled to operate, and the draught fan is controlled to operate.

In specific application, a value obtained after rounding of the sum of the temperature reference value and the humidity reference value can be compared with the preset standard value, the specific calculation modes refer to the embodiment, and unnecessary details are not given herein.

Furthermore, the method also comprises the following steps:

controlling the water pump to be standby if the current environment humidity is greater than or equal to the first preset humidity value; and/or controlling the water pump to operate and the draught fan to operate if the current environment temperature is less than the second preset humidity value.

Wherein, the first humidity value is greater than the second temperature value, generally, the first humidity can be 80, the second humidity can be 40, and adjustment can be performed according to actual conditions without limitation.

It should be understood that the second preset humidity value is the lowest value making a human body feel comfortable, and if the current environment humidity is less than the preset humidity value, the current environment is relatively dry, and the water pump needs to operate so as to increase the air humidity. If the current environment humidity is not less than the preset humidity value, the current environment humidity is within the human comfort range, and therefore, the water pump does not need to work. Therefore, the water pump can be prevented from working all the time to waste energy, and discomfort of a user due to too humid indoor environment is avoided.

According to the scheme of the disclosure, the current environment temperature and the current environment humidity are collected, the working states of the water pump and the draught fan in the air-conditioner fan are automatically adjusted according to the temperature and the humidity of the current environment, the degree of automation is improved, the energy is saved, and meanwhile, the user experience is improved.

Figure 2:
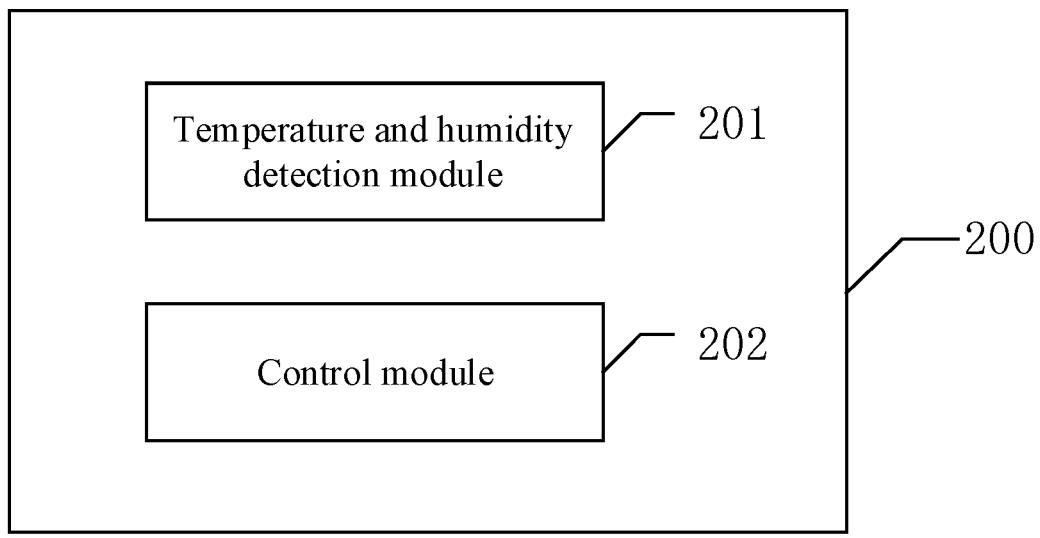
FIG. 2 is a structure diagram of a device for controlling an air-conditioner fan provided in one embodiment of the disclosure.

Referring to FIG. 2 which is a structure diagram of a device for controlling an air-conditioner fan provided in one embodiment of the disclosure, a control device 200 of the air-conditioner fan may comprise the following modules:
 a temperature and humidity detection module 201, used for collecting the current environment temperature and the current environment humidity; and
 a control module 202, used for determining the working states of a water pump and a draught fan in the air-conditioner fan based on the current environment temperature and the current environment humidity, wherein the working states comprise an operating state and a standby state.

Furthermore, in a feasible scheme, the control module is specifically used for
 controlling the draught fan to be standby and the water pump to be standby when the environment temperature is less than a first preset temperature; and/or
 controlling the draught fan to operate and the water pump to operate when the environment temperature is greater than or equal to a second preset temperature.

Furthermore, in another feasible scheme, the control module is also specifically used for
 determining a temperature reference value according to the first preset weight and the current environment temperature;
 determining a humidity reference value according to the second preset weight and the current environment humidity; and
 determining the working states of the draught fan and the water pump according to the temperature reference value, the humidity reference value and a preset standard value.

Furthermore, the control module determines the working states of the draught fan and the water pump according to the temperature reference value, the humidity reference value and the preset standard value, specifically executing the following steps:
 controlling the draught fan to operate and the water pump to operate if the sum of the temperature reference value and the humidity reference value is greater than the preset standard value; and/or
 controlling the draught fan to be standby and the water pump to be standby if the sum of the temperature reference value and the humidity reference value is less than or equal to the preset standard value.

Furthermore, the control module controls the water pump to be standby or operate, specifically executing the following steps:
 controlling the water pump to be standby if the current environment humidity is greater than or equal to the first preset humidity value; and/or
 controlling the water pump to operate if the current environment temperature is less than the second preset humidity value.

Furthermore, the temperature and humidity detection module comprises a temperature and humidity sensor; and/or
 the temperature and humidity sensor is arranged at an air inlet of the air-conditioner fan.

It is understood that the temperature and humidity sensor is installed at the air inlet of the air-conditioner fan, and the current environment temperature and humidity can be fed back in real time.

According to the scheme of the disclosure, the current environment temperature and the current environment humidity are collected, the working states of the water pump and the draught fan in the air-conditioner fan are automatically adjusted according to the temperature and the humidity of the current environment, the degree of automation is improved, the energy is saved, and meanwhile, the user experience is improved.

Figure 3:
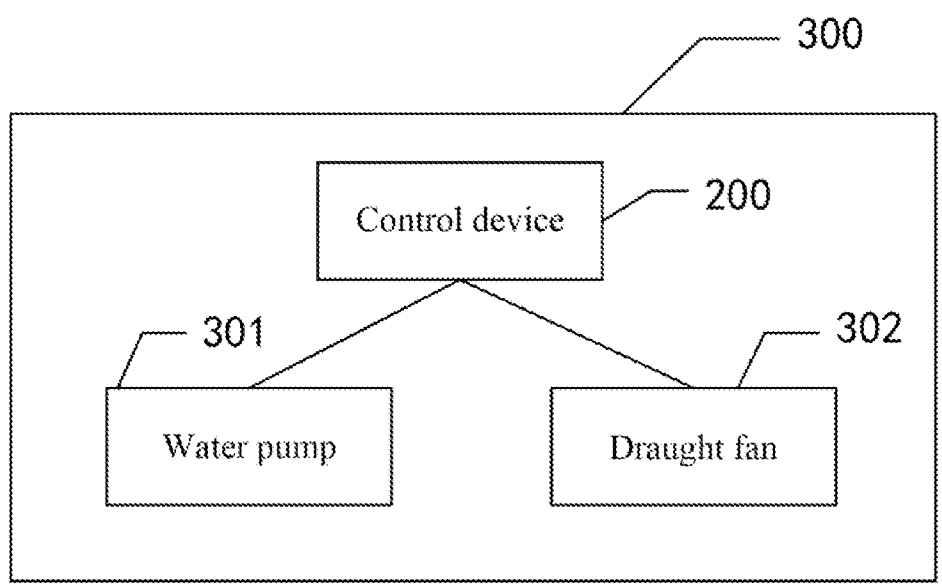
FIG. 3 is a structure diagram of an air-conditioner fan provided in one embodiment of the disclosure.

Referring to FIG. 3 which is a structure diagram of an air-conditioner fan provided in the embodiment of the disclosure, the air-conditioner fan 300 may comprise a control device 200, a draught fan 302 and a water pump 302, and the air-conditioner fan 300 can control the water pump 301 and the draught fan 302 to operate or be standby by using the control method.

According to the scheme of the disclosure, the current environment temperature and the current environment humidity are collected, the working states of the water pump and the draught fan in the air-conditioner fan are automatically adjusted according to the temperature and the humidity of the current environment, the degree of automation is improved, the energy is saved, and meanwhile, the user experience is improved.

For those skilled in the art, obviously, the disclosure is unlimited to the details of the exemplary embodiment, and the disclosure can be achieved in other specific forms without departing from the spirit or essential characteristics of the disclosure. Therefore, for every point, the embodiments should be regarded as exemplary embodiments and are unrestrictive, the scope of the disclosure is restricted by the claims appended hereto, and therefore, all changes, including the meanings and scopes of equivalent elements, of the claims are aimed to be included in the disclosure. The appended drawing reference signs in the claims shall not be regarded to limit the involved claims.

In addition, it should be understood that although the specification is described in terms of embodiments, not every embodiment contains only one independent technical scheme, such narrative form of the specification is for clarity only, those skilled in the art shall take the specification as a whole, and the technical schemes in each embodiment may also be combined as appropriate to form other embodiments that may be understood by those skilled in the art.

What is claimed is:
1. A method for controlling an air-conditioner fan, characterized in that the method comprises the following steps:
 collecting the current environment temperature and the current environment humidity;

and determining the working states of a water pump and a draught fan based on the current environment temperature and the current environment humidity, wherein the working states comprise an operating state and a standby state.

2. The method according to claim 1, characterized in that the step of determining the working states of the water pump and the draught fan based on the current environment temperature and the current environment humidity specifically comprises the following substeps:
controlling the draught fan to be standby and the water pump to be standby when the environment temperature is less than a first preset temperature; and/or
controlling the draught fan to operate and the water pump to operate when the environment temperature is greater than or equal to a second preset temperature.

3. The method according to claim 1, characterized in that the step of determining the working states of the draught fan and the water pump based on the current environment temperature and the current environment humidity also specifically comprises the following substeps:
determining a temperature reference value according to a first preset weight and the current environment temperature;
determining a humidity reference value according to a second preset weight and the current environment humidity; and
determining the working states of the draught fan and the water pump according to the temperature reference value, the humidity reference value and a preset standard value.

4. The method according to claim 3, characterized in that the step of determining the working states of the draught fan and the water pump according to the temperature reference value, the humidity reference value and the preset standard value specifically comprises the following substeps:
controlling the draught fan to operate and the water pump to operate if the sum of the temperature reference value and the humidity reference value is greater than the preset standard value; and/or
controlling the draught fan to be standby and the water pump to be standby if the sum of the temperature reference value and the humidity reference value is less than or equal to the preset standard value.

5. The method according to claim 1 characterized in that the method also comprises the following steps:
controlling the water pump to be standby if the current environment humidity is greater than or equal to a first preset humidity value; and/or
controlling the water pump to operate and the draught fan to operate if the current environment temperature is less than a second preset humidity value.

6. A device for controlling an air-conditioner fan, characterized by comprising
a temperature and humidity detection module, used for collecting the current environment temperature and the current environment humidity; and
a control module, used for determining the working states of a water pump and a draught fan in the air-conditioner fan based on the current environment temperature and the current environment humidity, wherein the working states comprise an operating state and a standby state.

7. The control device according to claim 6, characterized in that the control module is specifically used for
controlling the draught fan to be standby and the water pump to be standby when the environment temperature is less than a first preset temperature; and/or
controlling the draught fan to operate and the water pump to operate when the environment temperature is greater than or equal to a second preset temperature.

8. The control device according to claim 6, characterized in that the control module is also specifically used for
determining a temperature reference value according to a first preset weight and the current environment temperature;
determining a humidity reference value according to a second preset weight and the current environment humidity; and
determining the working states of the draught fan and the water pump according to the temperature reference value, the humidity reference value and a preset standard value.

9. The control device according to claim 8, characterized in that the control module determines the working states of the draught fan and the water pump according to the temperature reference value, the humidity reference value and the preset standard value, specifically executing the following steps:
controlling the draught fan to operate and the water pump to operate if the sum of the temperature reference value and the humidity reference value is greater than the preset standard value; and/or
controlling the draught fan to be standby and the water pump to be standby if the sum of the temperature reference value and the humidity reference value is less than or equal to the preset standard value.

10. The control device according to claim 6, characterized in that the control module controls the water pump to be standby or operate, specifically executing the following steps:
controlling the water pump to be standby if the current environment humidity is greater than or equal to a first preset humidity value; and/or
controlling the water pump to operate and the draught fan to operate if the current environment temperature is less than a second preset humidity value.

11. The control device according to claim 6, characterized in that the temperature and humidity detection module comprises a temperature and humidity sensor; and/or,
the temperature and humidity sensor is arranged at an air inlet of the air-conditioner fan.

12. An air-conditioner fan, characterized by comprising a control device according to claim 6, and a draught fan and a water pump; and/or the water pump and the draught fan are controlled to operate or be standby by using the control method according to claim 1.

* * * * *